United States Patent
Shatsky et al.

(10) Patent No.: US 11,650,920 B1
(45) Date of Patent: May 16, 2023

(54) WRITE CACHE MANAGEMENT

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 17/511,695

(22) Filed: Oct. 27, 2021

(51) Int. Cl.
*G06F 12/0804* (2016.01)

(52) U.S. Cl.
CPC .. *G06F 12/0804* (2013.01); *G06F 2212/1032* (2013.01)

(58) Field of Classification Search
CPC .............. G06F 12/0804; G06F 2212/1032
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,806,115 B1* | 8/2014 | Patel ................ | G06F 12/0246 711/104 |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,632,932 B1* | 4/2017 | Sutardja ................ | G06F 3/064 |
| 9,892,045 B1 | 2/2018 | Douglis et al. | |
| 10,078,598 B1 | 9/2018 | Wallace et al. | |
| 10,331,561 B1 | 6/2019 | Shilane et al. | |
| 10,445,180 B2 | 10/2019 | Butterworth et al. | |

(Continued)

FOREIGN PATENT DOCUMENTS

WO 2015108670 A1 7/2015
WO PCT/US2019/024885 1/2020

(Continued)

OTHER PUBLICATIONS

Dell EMC, "Dell EMC VxRack FLEX," Dell EMC Product Overview, 2018, 5 pages.

(Continued)

*Primary Examiner* — Prasith Thammavong
(74) *Attorney, Agent, or Firm* — Ryan, Mason & Lewis, LLP (57) ABSTRACT

A storage control system maintains a write cache in a non-volatile memory device of primary memory of a storage node. The write cache comprises a cyclic buffer and pointers to manage the write cache and track a tail location and head location of the write cache. The storage control system receives a write request from a host system, which comprises a data item to be written to primary storage. The received data item is written together with an associated metadata item at the head location of the write cache. The items in the write cache are arranged in a cyclic write order from the tail location to the head location. The storage control system sends an acknowledgment to the host system that the data item is successfully written to the primary storage, in response to the received data item and the associated metadata item being stored in the write cache.

20 Claims, 5 Drawing Sheets

(56) References Cited

U.S. PATENT DOCUMENTS

| | | | |
|---|---|---|---|
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0249001 | A1* | 10/2009 | Narayanan ............ G06F 3/0634 713/324 |
| 2009/0276593 | A1 | 11/2009 | Jacobson et al. |
| 2012/0096332 | A1* | 4/2012 | Furno ................. G06F 11/1068 714/763 |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2020/0133507 | A1* | 4/2020 | Liu ..................... G06F 11/1471 |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

Dell, "PowerVault MD3 SSD Cache Overview," White Paper, 2012, 22 pages.

U.S. Appl. No. 16/918,654 filed in the name of Rivka Matosevich et al., filed Jul. 1, 2020, and entitled "Sharing Memory Resources Between Asynchronous Replication Workloads."

U.S. Appl. No. 16/983,423 filed in the name of Dan Aharoni et al., filed Aug. 3, 2020, and entitled "Deferred Reclamation of Invalidated Entries that are Associated with a Transaction Log in a Log-Structured Array."

U.S. Appl. No. 17/065,754 filed in the name of Dan Aharoni et al., filed Oct. 8, 2020, and entitled "Direct Response to IO Request in Storage System with Remote Replication."

U.S. Appl. No. 17/070,073 filed in the name of Dan Aharoni et al., filed Oct. 14, 2020, and entitled "Direct Response to IO Request in Storage System Having an Intermediary Target Apparatus."

U.S. Appl. No. 17/070,288 filed in the name of Anurag Sharma et al., filed Oct. 14, 2020, and entitled "Pipeline-Based System for Configuration Checking and Reporting Associated with an Information Processing System."

U.S. Appl. No. 17/071,407 filed in the name of John Moran et al., filed Oct. 15, 2020, and entitled "Dynamic Remediation Actions in Response to Configuration Checks in an Information Processing System."

U.S. Appl. No. 17/077,105 filed in the name of Yosef Shatsky et al., filed Oct. 22, 2020, and entitled "Volume Tiering in Storage Systems."

U.S. Appl. No. 17/106,988 filed in the name of Rivka Matosevich et al., filed Nov. 30, 2020, and entitled "Managing Host Connectivity to a Data Storage System."

U.S. Appl. No. 17/123,525 filed in the name of Itay Keller et al., filed Dec. 16, 2020, and entitled "Deferred Reclamation of Invalidated Entries Associated with Replication in a Log-Structured Array."

U.S. Appl. No. 17/145,646 filed in the name of Yosef Shatsky et al., filed Jan. 11, 2021, and entitled "Redistribution of Processing Groups between Server Nodes Based on Hardware Resource Utilization."

U.S. Appl. No. 17/232,203 filed in the name of Roman Spiegelman, filed Apr. 16, 2021, and entitled "Object Synchronization of Server Nodes in a Network Computing Environment."

U.S. Appl. No. 17/236,256 filed in the name of Doron Tai et al., filed Apr. 21, 2021, and entitled "Recovery from Partial Device Error in Data Storage System."

U.S. Appl. No. 17/306,601 filed in the name of Rivka Matosevich et al., filed May 3, 2021, and entitled "Managing Replication Journal in a Distributed Replication System."

U.S. Appl. No. 17/308,166 filed in the name of Adi Bar Shalom et al., filed May 5, 2021, and entitled "Journal Barrier Consistency Determination."

U.S. Appl. No. 17/351,733 filed in the name of Yosef Shatsky et al., filed Jun. 18, 2021, and entitled "Data Deduplication in a Disaggregated Storage System."

U.S. Appl. No. 17/361,666 filed in the name of Yosef Shatsky et al., filed Jun. 29, 2021, and entitled "Tracking Utilization of Data Blocks in a Storage System."

U.S. Appl. No. 16/888,742 filed in the name of Rivka Matosevich et al., filed May 31, 2020, and entitled "Balancing Resiliency and Performance by Selective Use of Degraded Writes and Spare Capacity in Storage Systems."

* cited by examiner

WRITE CACHE MANAGEMENT

TECHNICAL FIELD

This disclosure relates generally to data storage management techniques and, more particularly, to techniques for write cache management.

BACKGROUND

A storage system can implement a write cache that persists write data with a minimal delay which allows the storage system to return an acknowledgement to a user with low latency. The write cache can be persisted using non-volatile memory, and configured and managed using cache structures and associated cache management methods that are optimized for the given type of non-volatile memory technology that is used to persist the write cache. A software-defined storage system comprises a storage architecture which separates or otherwise decouples the storage software from the underlying storage hardware. In particular, a software-defined storage system essentially implements a hardware independent storage control system which is configured to abstract storage and memory resources from the underlying hardware platform for greater flexibility, efficiency and faster scalability. In this regard, even when a given software-defined storage system comprises a write cache management system, the write cache management system may not be compatible or otherwise optimized for use with the non-volatile memory that is actually used in conjunction with the software-defined storage system.

SUMMARY

Exemplary embodiments of the disclosure include storage control systems which are configured to implement write cache structures and associated write cache management methods which are, e.g., compatible for use with multiple types of non-volatile memory media hardware. For example, a storage control system, maintains a write cache in a non-volatile memory device of primary memory of a storage node. The write cache comprises a cyclic buffer which comprises a plurality of pointers that are configured to manage the write cache, wherein the plurality of pointers are utilized by the storage control system to track a tail location of the write cache and a head location of the write cache. The storage control system receives a write request from a host system, wherein the write request comprises a data item to be written to primary storage. The storage control system writes the received data item together with associated metadata item to the write cache. The data item and the associated metadata item are written to the head location of the write cache, wherein items in the write cache are arranged in a cyclic write order from the tail location to the head location of the write cache. The storage control system sends an acknowledgment to the host system that the data item is successfully written to the primary storage, in response to the received data item and the associated metadata item being stored in the write cache.

Other embodiments of the disclosure include, without limitation, systems and articles of manufacture comprising processor-readable storage media, which are configured to implement write cache structures and associated write cache management methods.

DETAILED DESCRIPTION

Figure 1:
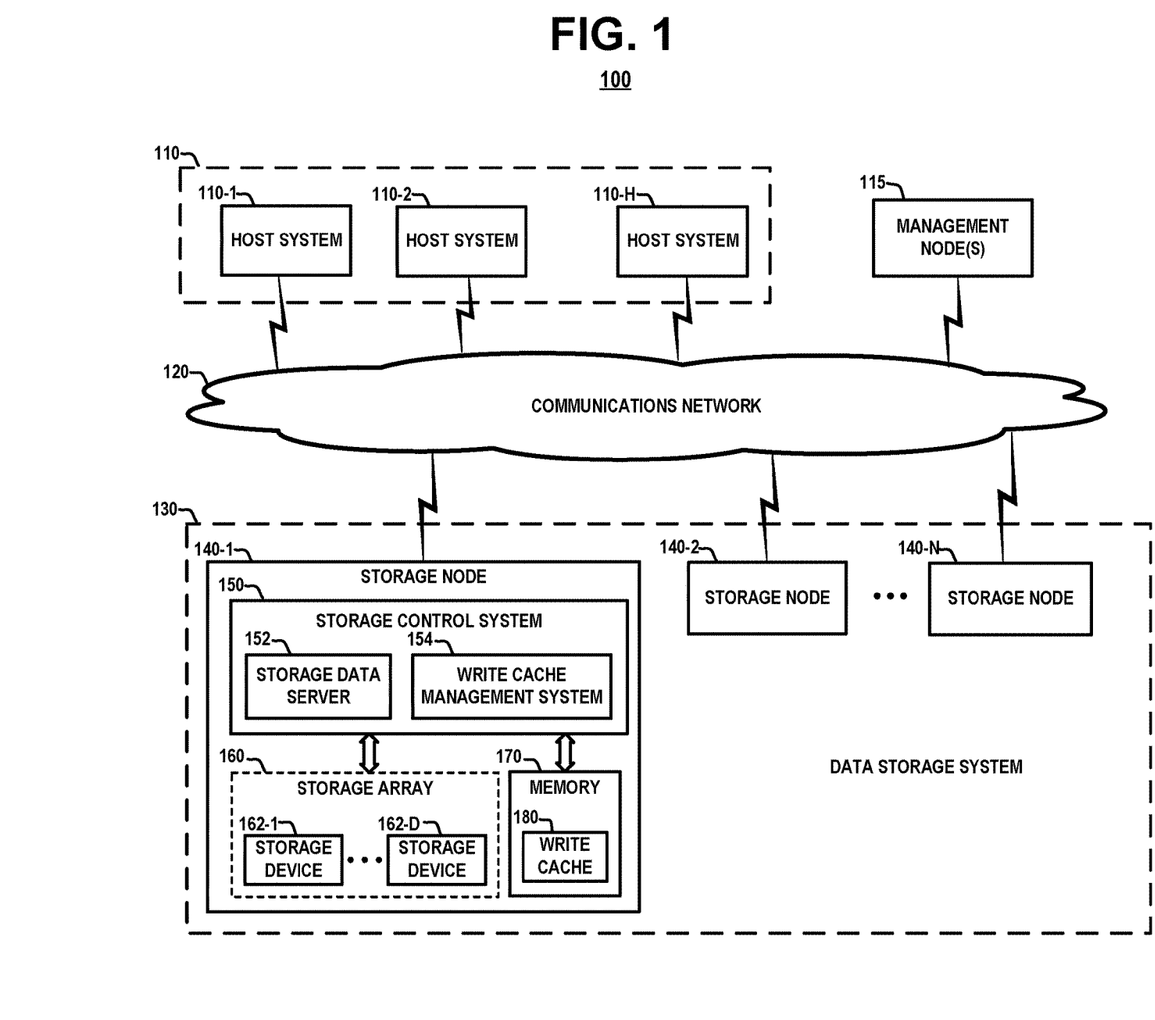
FIG. 1 schematically illustrates a network computing system comprising a data storage system which implements a write cache management system, according to an exemplary embodiment of the disclosure.

Exemplary embodiments of the disclosure will now be discussed in further detail with regard to systems and methods for implementing a write cache management system which is configured to implement a cyclic cache structure and cache control process that is compatible for use with multiple types of storage media hardware technologies such as solid-state drive (SSD) and persistent memory (PMEM) modules. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein FIG. 1 schematically illustrates a network computing system comprising a data storage system which implements a write cache management system, according to an exemplary embodiment of the disclosure. The network computing system 100 comprises one or more host systems 110-1, 110-2, . . . 110-H (collectively, host systems 110), one or more management nodes 115, a communications network 120, a data storage system 130. The data storage system 130 comprises one or more storage nodes 140-1, 140-2, . . . , 140-N (collectively, storage nodes 140). As shown in FIG. 1, the storage node 140-1 comprises a storage control system 150, a storage array 160 comprising a plurality of storage devices 162-1, . . . , 162-D (collectively, storage devices 162), and primary memory 170 (alternatively, system memory 170). The primary memory 170 comprises volatile random-access memory (RAM) and non-volatile RAM (NVRAM). In some embodiments, the other storage nodes 140-2 . . . 140-N have the same or similar configuration as the storage node 140-1 shown in FIG. 1. The storage control system 150 comprises a storage data server 152, and write cache management system 154 which is configured to provision and manage a write cache 180 in the primary memory 170, the functions of which will be described in further detail below.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage devices 162 of the storage nodes 140 and (ii) read requests to access data that is stored in storage devices 162 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement input/output (I/O) channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 600, shown in FIG. 6) having processor and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprises storage nodes, which are separate from the storage control nodes. In such a configuration, the storage control systems 150 are configured to handle the processing of data associated with data access requests (i.e., I/O read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of each storage node 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

The write cache management system 154 is configured to provision and manage the write cache 180 in the primary memory 170. As noted above, the primary memory 170 comprises volatile RAM such as dynamic RAM (DRAM), synchronous DRAM (SDRAM), etc. In addition, the primary memory 170 comprises non-volatile memory which is configured as RAM. In this regard, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express) using a suitable interface such as non-volatile memory express (NVMe).

In the context of a software-defined storage system, the storage control system 150 is essentially a hardware independent storage control system which is configured to abstract storage and memory resources from the underlying hardware platform for greater flexibility, efficiency and faster scalability. In this regard, with respect to write cache management system 154, the storage control system 150 will have no control over the types of non-volatile memory devices that will be used as part of the primary memory 170 during run-time. Therefore, in accordance with exemplary embodiments of the disclosure, the write cache management system 154 comprises methods for provisioning and managing a write cache in a manger which is essentially hardware independent of the type(s) of non-volatile memory device(s) utilized for the primary memory 170.

In some embodiments, the write cache management system 154 is configured to implement a write cache structure and associated cache control processes which are compatible for use with multiple types of non-volatile memory media hardware technologies such as SSD and PMEM, wherein operating characteristics of the different non-volatile memory devices are taken into consideration to implement a memory hardware-independent write cache system. For example, a persistent memory device is a byte-addressable memory device, while an SSD memory device implements a block interface. Moreover, the cost of each write to an SSD device is relatively high, as compared to writing to a persistent memory device, so fewer large updates are preferred over many small updates. In view of such operating characteristics, among others, a cache management system according to an exemplary embodiment utilizes a cyclic, contiguous, predefined-size buffer to implement the write cache 180. As explained in further detail below, a significant advantage of implementing a write cache using a cyclic buffer is that no metadata is needed to describe the structure of the write cache. In contrast, conventional dynamic solutions require metadata to indicate the location of each piece of the write cache, wherein adding items in the cache would require the additional metadata to be persisted, requiring an additional write. Exemplary systems and methods for write cache management according to embodiments of the disclosure will now be discussed in further detail in conjunction with FIGS. 2-5.

Figure 2:
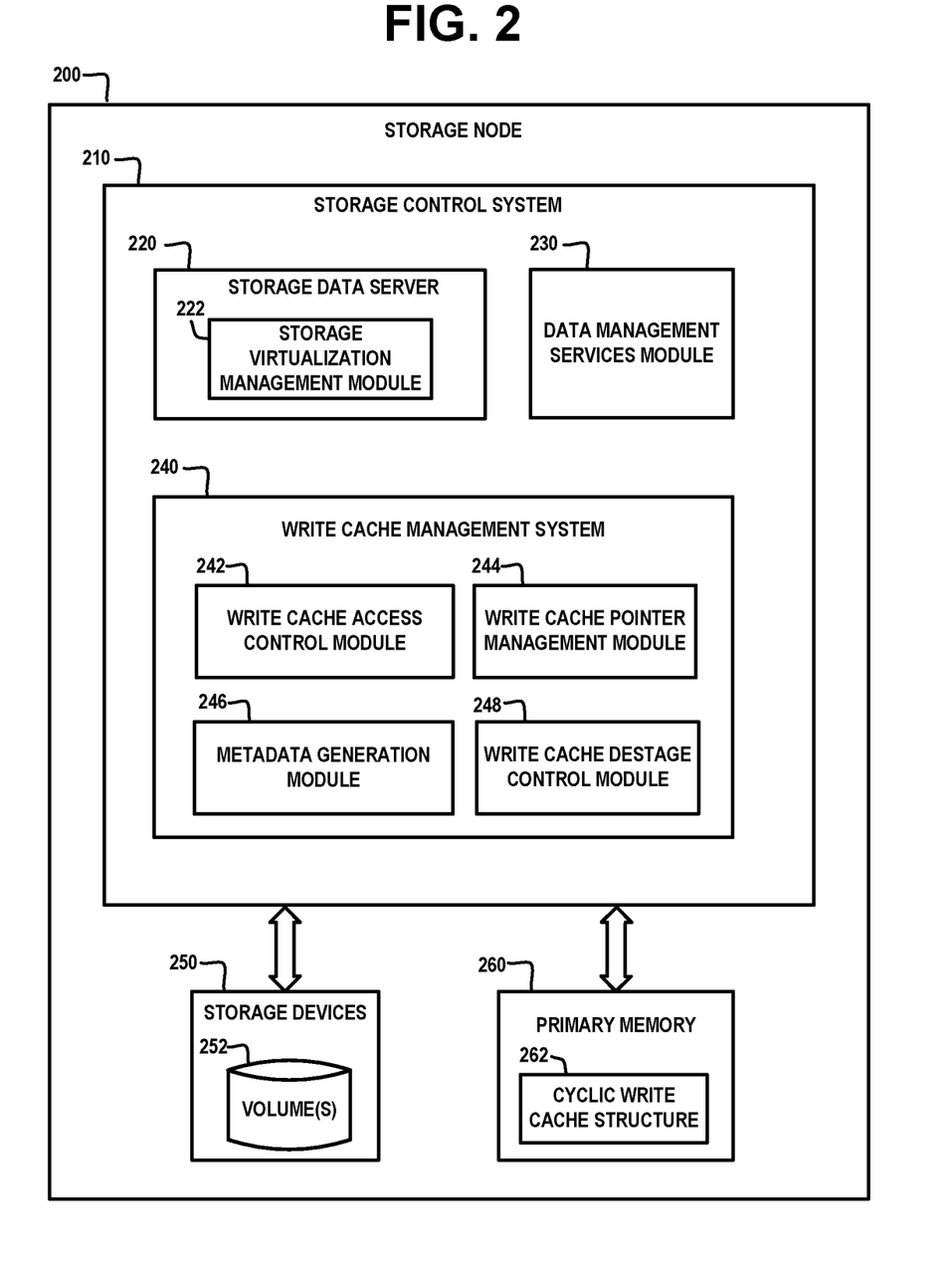
FIG. 2 schematically illustrates a storage node which comprises a write cache management system, according to an exemplary embodiment of the disclosure.

FIG. 2 schematically illustrates a storage node which comprises a write cache management system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 230, and a write cache management system 240. The storage data server 220 comprises a storage virtualization management module 222. The write cache management system 240 comprises various modules including, but not limited to, a write cache access control module 242, a write cache pointer management module 244, a metadata generation module 246, and a write cache destage control module 248. The storage node 200 further comprises an array of storage devices 250 and primary memory 260. The storage devices 250 have capacity which is partitioned into one or more storage volumes 252. The primary memory 260 comprises a cyclic write cache structure 262 which is provisioned in the primary memory 260 and managed by the write cache management system 240. In some embodiments, the cyclic write cache structure 262 resides in a region of non-volatile RAM (e.g., PMEM memory, SSD memory, etc.), which is allocated for the cyclic write cache structure 262.

The storage data server 220 implements functions as discussed above such as processing I/O write and read requests received from host systems to write/read data to/from the storage devices 250. The storage virtualization management module 222 implements any suitable logical volume management (LVM) system which is configured to create and manage the storage volumes 252 by aggregating the capacity of the storage devices 250 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 250) and presents logical (virtualized) addresses to users in the form of LUNs, the storage data server 220 generates and manages metadata to provide mapping between logical addresses and physical addresses. In addition, the storage control system 210 generates and manages metadata which is utilized for managing snapshots, change tracking for remote replication, managing deduplication pointers, managing data compression, resiliency related metadata (e.g., RAID), etc.

The various modules of the write cache management system 240 collectively implement methods that are configured to provision and manage the cyclic write cache structure 262 in the primary memory 260. For example, the write cache access control module 242 implements methods to store data items and associated metadata items in the cyclic write cache structure 262 according to data placement scheme, as discussed in further detail below. Further, in some embodiments, the write cache access control module 242 is configured to consolidate small sequential writes of multiple data write requests into one larger write that is stored in the cyclic write cache structure 262. In addition, the write cache access control module 242 is configured to return an acknowledgment message to the calling application or host system after the write data is written into the cyclic write cache structure 262.

The write cache pointer management module 244 implements methods that are configured to manage a set of pointers that are used in conjunction with the cyclic write cache structure 262 to (i) determine a tail location and head location of the write cache, (ii) determine a location in the write cache from where a recovery process begins, and to (iii) determine which data items have been destaged and persisted to storage. The metadata generation module 246 implements methods that are configured to generate metadata items that are associated with data items to be stored in the write cache. The metadata includes information which is used to track the location of the cached data items, and any other relevant information that may be associated with the data items to implement the cache management functions as discussed herein. The write cache destage control module 248 implements methods that are configured to control the destaging of data items and metadata items from the write cache, and for generating checkpoints of the metadata items. The functions of the exemplary modules 242, 244, 246, and 248 will be discussed in further detail below.

Figure 3:
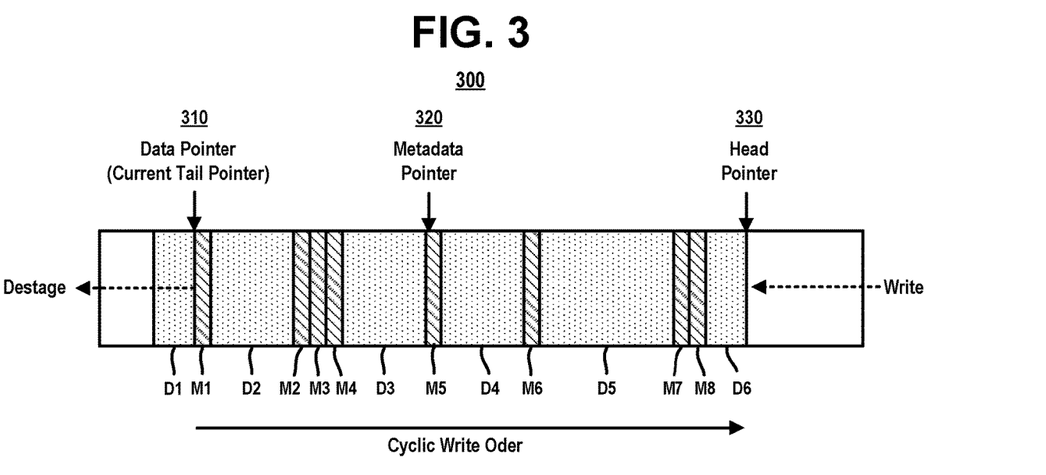
FIG. 3 schematically illustrates a cyclic cache structure for implementing a write cache, according to an exemplary embodiment of the disclosure.

FIG. 3 schematically illustrates a cyclic cache structure for implementing a write cache, according to an exemplary embodiment of the disclosure. In particular, FIG. 3 schematically illustrates a cyclic write cache 300 which comprises a cyclic, contiguous buffer having a configurable predefined size, which is allocated in a given region of a non-volatile memory device. The size of the cyclic write cache 300 can be adjusted as needed. In some embodiments, the cyclic write cache 300 comprises a size on the order of gigabytes per storage node. As schematically illustrated in FIG. 3, the cyclic write cache 300 comprises data items D1, D2, D3, D4, D5, and D6 and metadata items M1, M2, M3, M4, M5, M6, M7, and M8. The write cache 300 is managed using a plurality of pointers including a data pointer 310, a metadata pointer 320, and a head pointer 330.

In some embodiments, the write cache 300 is organized into fixed-size addressable units (e.g., allocation units) with a predefined block size of 512 bytes to thereby allow the write cache 300 to support block media. In this regard, each data item D1, D2, D3, D4, D5, and D6 comprises one or more blocks of data of the predefined block size, e.g., a given data item can have block size of 512 bytes, or multiples of 512 bytes (e.g., 1,024 bytes, 2,048 bytes, 4,096 bytes, 8,192 bytes, 16,384 bytes, etc.) before data compression (if implemented). Each metadata item M1, M2, M3, M4, M5, M6, M7, and M8 comprises one or more blocks of metadata associated with the data items D1, D2, D3, D4, and D5. A given metadata item can have block size of 512 bytes, or a multiple thereof. A single write to the write cache 300 can include one or more data items and metadata items.

There are various advantages to utilizing the cyclic write cache 300 and associated write cache management methods as discussed herein. For example, the write cache management system 240 does not utilize persisted metadata to describe the structure of the cyclic write cache 300, rather metadata is maintained and updated in RAM (non-persisted state) to enable a random-access lookup of the items in the write cache 300 so that the write cache 300 can be utilized to serve read requests to the cached data items. The write cache 300 is managed using the data pointer 310, the metadata pointer 320, and the head pointer 330 and based on the cyclic property of the write cache 300. In some embodiments, the write cache 300 does not implement a separate tail pointer, but rather the tail location of the write cache 300 is determined as the minimum of the data pointer 310 and the metadata pointer 320.

The head pointer 330 points to the head location of the cyclic write cache 300. The metadata pointer 320 points to a location of a first metadata item (e.g., metadata item M5), in the cyclic order from the tail location to the head location of the cyclic write cache 300, which has not been persisted in a primary metadata storage as part of a metadata destage/checkpoint operation, as discussed in further detail below. In other words, the metadata pointer 320 points to a location in the cyclic write cache 300 from where a recovery process or a new metadata destage/checkpoint operation begins.

The data pointer 310 to a location of a last data item which has been persisted to primary storage are part of a data destage process. For example, in the exemplary embodiment of FIG. 3, data pointer 310 points to an end of the data item D1, which indicates that the data item D1, and other data items (not shown) located before D1, have been destaged and persisted to primary storage. The data pointer 310 and the metadata pointer 320 are used to determine the tail location of write cache 300, which is the minimum of the data pointer 310 and the metadata pointer 320. For example, in the exemplary embodiment of FIG. 3, the data pointer 310 represents the tail location of the cyclic write cache 300 and, thus, serves as the current tail pointer at the point-in-time shown in FIG. 3.

The write cache 300 is managed based, in part, on the cyclic property of the write cache, wherein new items (e.g., data items and metadata items) are always added to the head of the write cache 300 (as determined by the head pointer 330), and items are always destaged from the tail of the write cache 300, in order (wherein, as noted above, the tail is determined based on a minimum of the data pointer 310, and the metadata pointer 320). In this regard, the write cache 300 comprises a plurality of items (data and metadata) that are sequentially written to provide a cyclic write order as shown in FIG. 3. This is in contrast to conventional RAM-based write cache systems which store data items in the write cache and utilize a separate persistent metadata structure to store metadata to enable random access to the cached data items in the write cache (which requires additional write operations to update the cache structure metadata). Instead, the exemplary write cache management systems and methods as discussed herein do not implement a separate metadata structure to persistently store metadata, since the metadata items are persistently stored in the write cache 300 which is utilized to recover the cached metadata items in the event of a failure. As such, no additional write operations are needed to update a persistent metadata structure associated with the write cache 300.

Furthermore, the use of the cyclic write cache 300 and associated write cache management methods as discussed herein provide reduced overhead for handling data and associated metadata. In particular, the use of the cyclic write cache 300 provides reduced write overhead by storing data and associated metadata together in the cyclic write cache 300 without the need to persist the metadata in a separate persistent data structure. This is in contrast to conventional write cache techniques in which the data structure for storing data are separate from the metadata structure(s) for storing the associated metadata, which requires multiple write operations. On the other hand, the continuous nature of the cyclic write cache 300 allows recovery of the content of the cyclic write cache 300 (via a recovery process) by simply parsing the cyclic write cache 300 sequentially, starting from the tail location of the cyclic write cache 300. The metadata is updated only in RAM at first, using the cyclic write cache 300 as a source for metadata recovery if needed. As explained below, the metadata is eventually persisted separately, during a metadata destage process. The metadata may be persisted in a random-access format which allows the metadata to be removed from RAM as necessary, and performing one metadata read when the relevant metadata is no longer in RAM.

Furthermore, the use of the cyclic write cache 300 and associated write cache management methods as discussed allow small updates to be consolidated to a single write to the cyclic write cache 300. In particular, as noted above, the write cache management system 240 is configured to minimize a number of writes to the cyclic write cache 300 by consolidating many items into a single write operation. This is possible with the cyclic write cache 300 because all new items are always added to the head of the cyclic write cache 300 as indicated by the head pointer 330. This is particularly advantageous for metadata only updates that are relatively small (e.g., tens of bytes). In addition, even data updates, which are typically large enough to be written alone (i.e., not grouped with other data items), will benefit from reduced latency when written alone. If there are other metadata items to be written at a given time, then the data item is written together with the metadata items.

The write cache management system 240 implements write cache eviction/destaging operations (via the write cache destage control module 248) which take into consideration that the cyclic write cache 300 comprises both data items and associated metadata items, which are separate entities that are persisted in different primary data structures. In some embodiments, the write cache destaging operations are configured to destage data items and destage metadata items separately, based on associated eviction/destaging policies. The destaging operations are configured to determine if there is any difference between data items and metadata items.

In addition, in some embodiments, the destage operations are performed atomically using a checkpointing process in which a checkpoint is utilized to take a point-in-time checkpoint, of some data and metadata in the cyclic write cache 300, not necessarily the same amount as data and metadata can be destaged in an unequal amount. From the perspective of the cyclic write cache 300, the checkpoint is the starting point for recovery. In some embodiments, the checkpoint is persisted in a primary data structure in the primary memory. A checkpoint is a consistent state of metadata that is resilient. A system must retain at least one previous checkpoint at any given time, including while creating a new checkpoint. Once a new checkpoint is created, the previous checkpoint can be deleted. Any suitable checkpointing scheme can be implemented.

During the destage operation, there can be separate primary data structures for the data and metadata, so the data items and metadata items can be destaged separately by using the separate data and metadata pointers 310 and 320. As noted above, cached items are removed from the tail of the cyclic write cache 300 according to cache destage policies described below to make free space to add items to head of the write cache. While "hot" items cannot be maintained in the write cache indefinitely, the write cache system still benefits from write hits, because entries being destaged from the tail that are invalid (e.g., were since rewritten) are not destaged.

More specifically, with the exemplary cyclic write cache 300, the tail of the cyclic write cache 300 can only move forward, and space can be freed from the cyclic write cache 300 once data items and metadata items have been destaged. In some embodiments, metadata items and data items can be destaged separately through metadata destage and data destage operations. The tail of the cyclic write cache 300 will move based on the lower of the metadata destage and data destage operations. The data pointer 310 and the metadata pointer 320 are used to track the progress of the metadata and data destage operations. As noted above, the metadata pointer 320 points to a location in the cyclic write cache 300 from where a recovery process or a new metadata destage/checkpoint operation begins, and the data pointer 310 points to a location which indicates what data items have already been destaged and persisted to storage. The data pointer 310 and the metadata pointer 320 are used to determine the tail location of write cache 300, which is the minimum of the data pointer 310 and the metadata pointer 320. For example, in the exemplary embodiment of FIG. 3, the data pointer 310 points to the tail of the cyclic write cache 300. As with cyclic buffers, the tail is the blocker point for the head. Once the head reaches the tail the cyclic write cache 300 is deemed full.

In accordance with exemplary embodiments of the disclosure, there are various factors that are considered with regard to destaging data items and destaging metadata items. For example, data destage factors include, but are not limited to, the following factors. Since cached data items occupy most of the capacity of the cyclic write cache 300, the write cache management system 240 is configured to prevent the cyclic write cache 300 from becoming too full such that the cyclic write cache 300 may not be able to handle write bursts. However, it is advantageous to maintain a relatively large amount of data items in the cyclic write cache 300 to maximize write hits. On the other hand, the destaging of data items should occur before the cyclic write cache 300 is approaching maximum capacity as the destage operations take time to perform and should be completed before the cyclic write cache 300 reaches maximum capacity. Furthermore, for systems using erasure coding (e.g., RAID 5 or RAID 6), it is a performance advantage to write full-stripe-writes to the cyclic write cache 300. In this regard, the data destage operation can be coordinated with a stripe size to fill a full stripe (although it is to be noted that the size of the data in the cyclic write cache 300 may not be equal to the size of the destaged data if inline data compression/reduction is implemented.

Furthermore, the metadata destage factors include, but are not limited to, the following factors. All metadata items in the cyclic write cache 300, which were not included in the most recent checkpoint, need to be recovered after a failure. The recovery process involves reading the cyclic write cache 300, parsing it, and replaying the items one at a time to reconstruct the lost RAM metadata. Metadata requires structure, so for recovery, the metadata must be rebuilt such that the recovery of metadata comes at a cost. To minimize or cap the duration of the recovery process, there should be a relatively limited amount (e.g., predefined maximum threshold) of metadata items in the cyclic write cache 300. In some embodiments, when a threshold number (or amount) of metadata items is reached, a metadata destage operation will be performed to remove metadata items from the cyclic write cache 300.

In some embodiments, the write cache destage control module 248 implements destaging methods that are configured to perform separate data destaging and metadata destaging operations based, at least in part, on the above-noted factors. During operation, the write cache management system 240 writes data items and metadata items to the cyclic write cache 300. The cyclic write cache 300 persists the data with a minimal delay which allows the system to return an acknowledgement to the user with low latency. Since writes to the cyclic write cache 300 are acknowledged to the host system, the cyclic write cache 300 must also be capable of serving reads. To serve reads, the data in the cyclic write cache 300 must have lookup capabilities. The write cache is optimized for write not for read, and so the metadata in the write cache is not random access. In some embodiments, the lookup capability is provided by a lookup structure in RAM. The write cache also serves as a source of recovery. This is a temporary state until the data and metadata are destaged from the cache to the storage devices.

In an exemplary embodiment, the write cache destage control module 248 implements a checkpoint process as part of the destage operations A checkpoint stores all the metadata for a consistent point-in-time as standalone metadata, outside of the cyclic write cache 300. As part of the checkpoint process, the metadata pointer 320 of the cyclic write cache 300 is advanced forward accordingly, so that all metadata items appear only once in either the checkpoint or in the cyclic write cache 300, but not both. The checkpointing operation and destage operation are configured to synchronize the persistency of the metadata to a native primary data structure and the eviction of the metadata from the cyclic write cache 300. While a checkpoint is being generated, a previous checkpoint is preserved for purposes of recovery in the event there is a system failure while the new checkpoint is being created. In some embodiments, to maximize efficiency, a new checkpoint that is generated only includes the changes from the previous checkpoint. This is significantly fewer updates than what would be required if each checkpoint contained all the metadata. Furthermore, when releasing the previous checkpoint, only those portions of the previous checkpoint which are not used by the new checkpoint are released.

Figure 4:
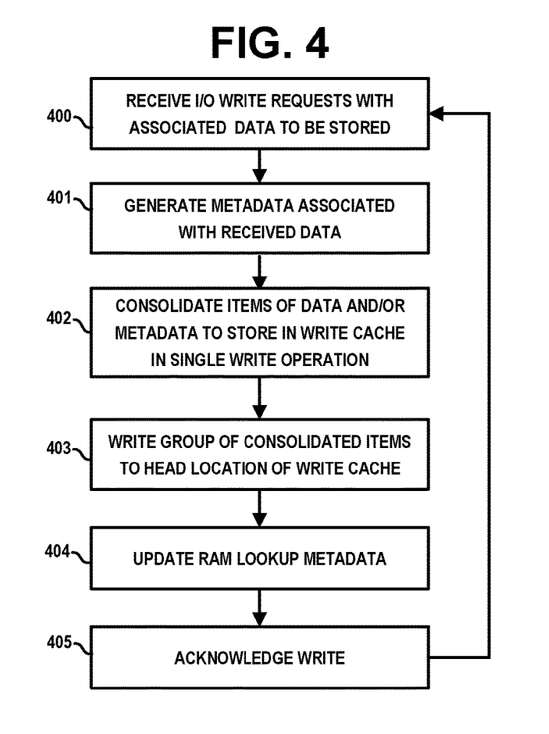
FIG. 4 illustrates a flow diagram of a method for writing items to a write cache, according to an exemplary embodiment of the disclosure.

FIG. 4 illustrates a flow diagram of a method for writing items to a write cache, according to an exemplary embodiment of the disclosure. In some embodiments, FIG. 4 illustrates an exemplary process flow that is performed by the storage control system 210 and write cache management system 240 (FIG. 2) to store data and metadata items to a cyclic write cache (e.g., cyclic write cache 300, FIG. 3), according to an exemplary embodiment of the disclosure. During operation, the storage control system 210 receives I/O write requests from host systems, wherein the I/O write requests include associated data (new data, and/or updated data) to be stored (block 400). In some embodiments, the incoming I/O write data are temporarily buffered in memory (e.g., RAM buffer) before writing the data to the write cache. This allows storage control system 210 to divide the incoming data into data blocks of a given size (e.g., 512 bytes, 4 KB, etc.) and consolidate small sequential writes into a single larger write with block size(s) that are based on, e.g., a predefined and programmable write cache threshold value(s). In addition, the write cache management system 240 generates metadata which is associated with the write data, and which is to be stored in the write cache together with the write data (block 401).

Before writing items to the write cache, the write cache management system 240 will consolidate data items and/or metadata items into a single item to be written to the write cache (block 402). The write cache management system 240 will write a group of consolidated data items and/or metadata items to the write cache in a single write operation (block 403). As noted above, the new item(s) are written to the head location of the write cache, which is determined by the head pointer 330. In some embodiments, the metadata is updated in a primary data structure in RAM (bock 404) to enable random access lookup of the items in the write cache so that the write cache can be utilized to serve read requests to the cached data items.

Once data associated with a given I/O write request from a given host system is stored in the write cache and is indexed in RAM, the storage control system 210 will return an acknowledgement to given host system (block 405). In the event a failure, a recovery process can be performed using the items persisted in the write cache. In this instance, the current location of the data pointer 310 and the metadata pointer 320 will be used to determine the which items needed to be recovered. In particular, in the event of a failure, the write cache can be replayed, starting from a point-in-time where the changes have not been persisted and are lacking in the system, up to the point of failure.

Figure 5:
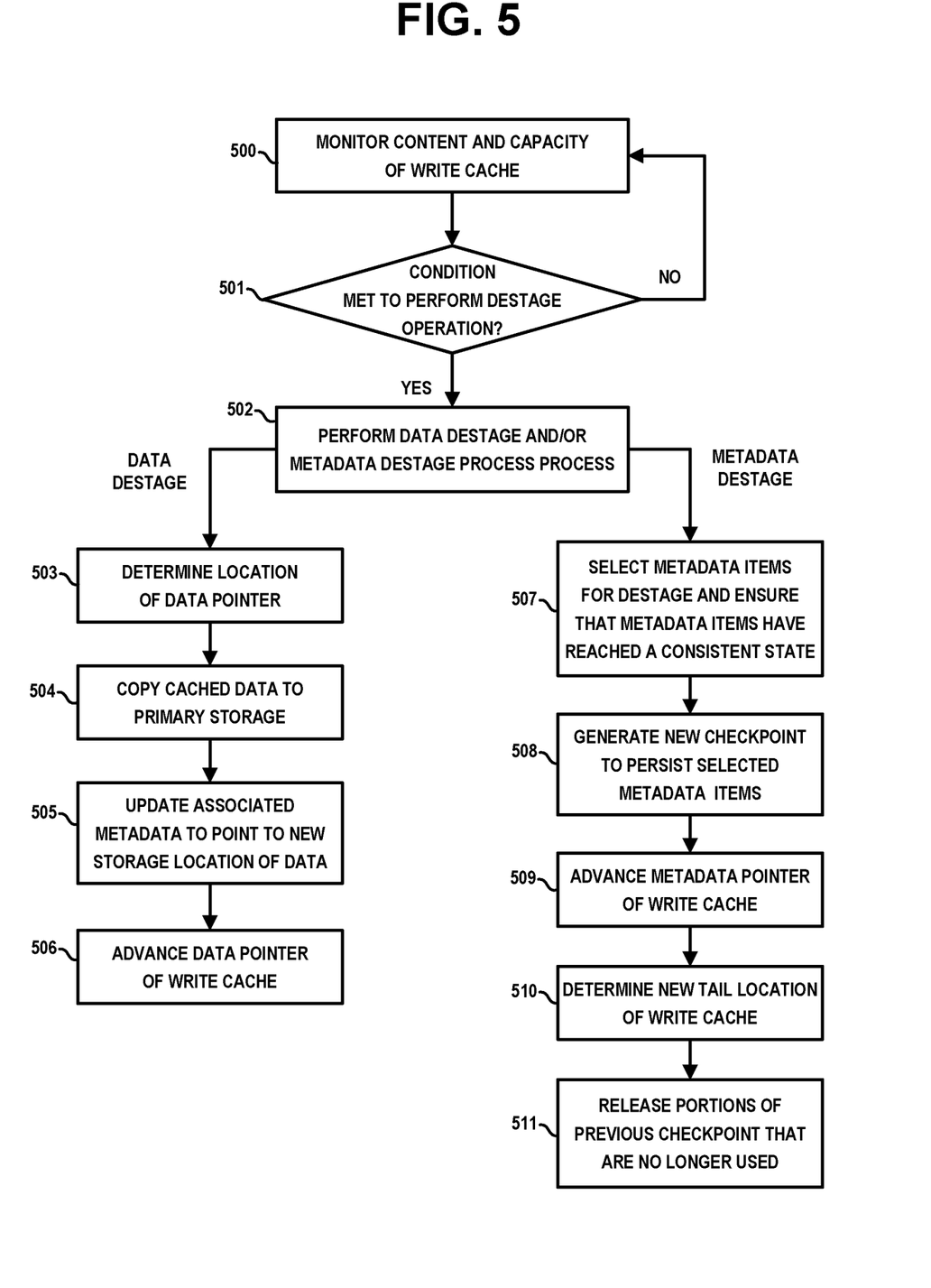
FIG. 5 illustrates a flow diagram of a method for destaging cached items from a write cache, according to an exemplary embodiment of the disclosure.

FIG. 5 illustrates a flow diagram of a method for destaging cached items from a write cache, according to tracking the utilization of data blocks in a storage system, according to an exemplary embodiment of the disclosure. In some embodiments, FIG. 5 illustrates an exemplary process flow that is performed by the storage control system 210 and the write cache management system 240 (FIG. 2) to store destage data items and metadata items from a cyclic write cache (e.g., cyclic write cache 300, FIG. 3), according to an exemplary embodiment of the disclosure. The write cache management system 240 monitors the content and capacity of the cyclic write cache to determine when a given condition is met to perform a destage operation (block 500). For example, in some embodiments, the write cache management system 240 monitors the amount of metadata items in the cyclic write cache to determine if the amount of cached metadata items has met a predetermined threshold number. Further, in some embodiments, the write cache management system 240 monitors the amount of used and/or remaining capacity of the write cache to determine if the write cache is nearing a maximum capacity.

When the write cache management system 240 determines that one or more conditions have been met to perform a destage operation (affirmative determination in block 501), the write cache management system 240 will initiate a data destage and/or metadata destage operation (block 502). For example, if the write cache management system 240 determines that the used capacity (or remaining capacity) of the write cache has met a predefined threshold value, the write cache management system 240 may initiate a data destage operation. Further, if the write cache management system 240 determines that the amount of cached metadata items has met or exceeded a predefined threshold value, the write cache management system 240 may initiate a metadata destage operation.

In some embodiments, a data destage operation is performed as follows. The write cache management system 240 will determine the location of the data pointer of the cyclic write cache (e.g., data pointer 310, FIG. 3) to determine which data items have already been persisted to storage, and to determine the next data item, which is at or near the tail location of the cyclic write cache, to include in the data destage operation (block 503). The write cache management system 240 will then parse through the cyclic write cache, in cyclic order, starting from the data pointer and moving toward the head of the cyclic write cache, to select one or more cached data items and copy the cached data items to primary storage (block 504). In some embodiments, the data destage operation is performed such that the amount of cached data items that are destaged and copied to primary storage is performed to enable one or more full stripe writes to the primary storage.

Next, the write cache management system 240 will update the metadata associated with the destaged data items to point to the new storage locations of the data items (block 505). At this point, the changed metadata is not persisted, so the associated destaged data is not yet removed from the cyclic write cache. However, the write cache management system 240 will advance the data pointer of the cyclic write cache to indicate which data items have been copied to storage (block 506).

In some embodiments, a metadata destage operation is performed as follows. As noted above, a metadata destage operation involves performing a checkpoint process to generate a metadata checkpoint. In an exemplary non-limiting embodiment, a checkpoint process involves selecting a plurality of metadata items to destage from the write cache, while ensuring that the selected metadata items have reached a consistent state (block 507). The metadata items are selected in an order starting from the metadata pointer of the cyclic cache towards the head location of the cyclic cache. The metadata items are destaged by updating a RAM checkpoint structure with copies of the selected metadata items. During the destage operation, the process does not prohibit writes to the cyclic write cache, but only blocks processing that leads to further updates of the metadata items selected for destaging. It is to be understood that there is flexibility in determining what changes are included in the current checkpoint and what changes are left for the next checkpoint. However, a change that is persisted in the current checkpoint must be removed from the cyclic write cache, and a change not in the checkpoint must not be removed from the cyclic write cache.

Next, the write cache management system 240 proceeds to generate a new checkpoint to persist the selected metadata items that were destaged from the cycle write cache (block 508). More specifically, once the checkpoint structure has been generated in RAM to include the metadata items destaged from the cyclic write cache, the new checkpoint will be persistently written to, e.g., a non-volatile memory device of primary memory, or a storage device of primary storage, etc. The metadata pointer of the cyclic write cache is then advanced forward to the location of the next metadata item that was not selected for the current checkpoint, but which will be included in the next checkpoint (block 509). At this point, the new location of the metadata pointer of the cyclic write cache separates the cached metadata items that are included in the current checkpoint from the cached metadata items to be included a subsequent checkpoint.

Next, the write cache management system 240 determines the new tail location of the cyclic write cache (block 510). As noted above, in some embodiments, the tail location will be determined based on the minimum of the data pointer and the metadata pointer. At this point, cached items that are located behind the new tail location are considered "free" and provide free space in the write cache which can be overwritten. The write cache management system 240 will release portions of the previous checkpoint that are no longer used and needed (block 511). Following completion of the metadata destage operation, recovery is no longer required for the destaged metadata.

In view of the above, it is to be appreciated that the exemplary write cache structures and associated write cache management methods discussed herein provide various advantages. For example, the exemplary cyclic write cache and management techniques are memory hardware independent and can support various types of non-volatile memory technologies such as PMEM and SSD. In addition, as noted above, no persisted metadata changes are needed to describe the structure of the write cache, so there is no overhead associated with managing and updating write cache structure metadata. In addition, the exemplary techniques as discussed here allow groups of small updates to be consolidated into a single write to the write cache. Moreover, since metadata items associated with data items are stored in the write cache together with the data items, there is no need to persist the metadata separately before returning an acknowledgement of the write to a host system. In addition, the exemplary write cache management techniques disclosed herein allow for separate data and metadata destaging, as destaged metadata items and data items are persisted in separate and different primary data structures. Further, the use of checkpoint to persist metadata minimizes the I/O required to persist the metadata structures. In addition, data destaging can be optimize for writing full stripes to a RAID array (e.g., RAID 5 or RAID 6 array).

Figure 6:
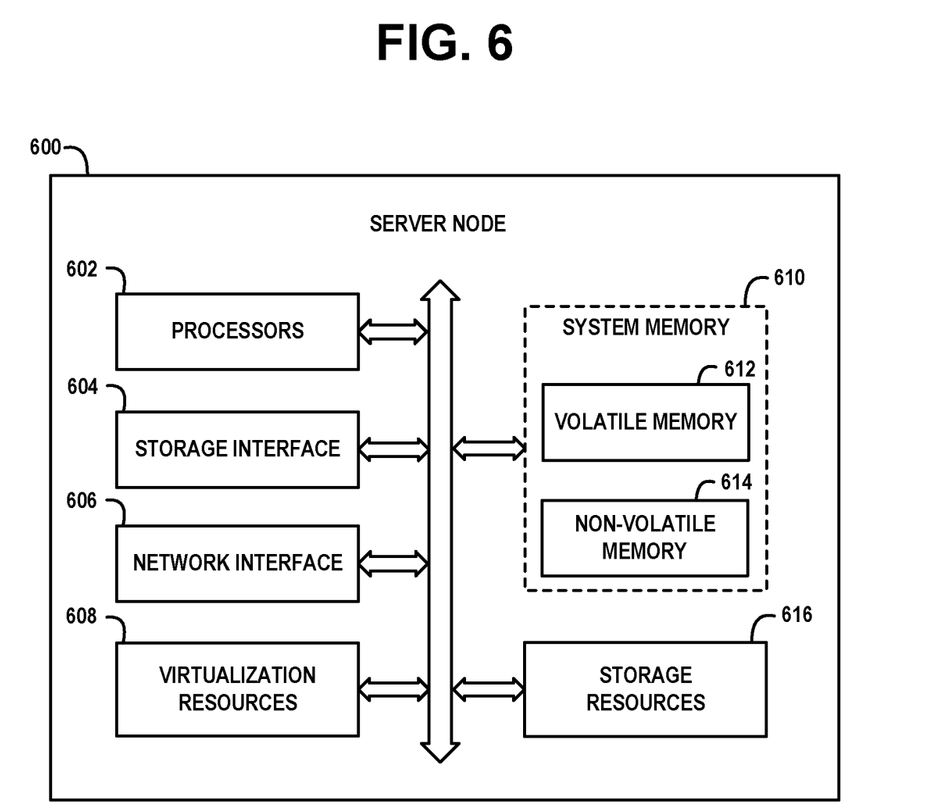
FIG. 6 schematically illustrates a framework of a server node for hosting a storage node which comprises a write cache management system, according to an exemplary embodiment of the disclosure.

FIG. 6 schematically illustrates a framework of a server node for hosting a storage node which comprises a write cache management system, according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of a storage control system and associated write cache management system as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of storage control systems and associated write cache managing systems as discussed herein are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of non-volatile memory devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   maintaining, by a storage control system, a write cache in a non-volatile memory device of primary memory of a storage node, wherein the write cache comprises a cyclic buffer which comprises a plurality of pointers that are configured to manage the write cache, wherein the plurality of pointers are utilized by the storage control system to track a tail location of the write cache and a head location of the write cache;
   receiving, by the storage control system, a write request from a host system, wherein the write request comprises a data item to be written to primary storage;
   writing, by the storage control system, the data item together with an associated metadata item to the write cache, wherein the data item and the associated metadata item are written to the head location of the write cache, wherein items in the write cache are arranged in a cyclic write order from the tail location to the head location of the write cache; and sending, by the storage control system, an acknowledgment to the host system that the data item is successfully written to the primary storage, in response to the data item and the associated metadata item being stored in the write cache.

2. The method of claim 1, further comprising consolidating, by the storage control system, a plurality of data items associated with a plurality of received write requests, together with metadata items associated with the plurality of data items, into a single write operation to the write cache.

3. The method of claim 1, wherein:
the plurality of pointers comprise a head pointer, a metadata pointer, and a data pointer;
the metadata pointer points to a location of a first metadata item, in the cyclic write order from the tail location to the head location of the write cache, which has not been persisted in a primary metadata storage;
the data pointer points to a location of a last data item which has been persisted to the primary storage; and
the storage control system determines the tail location of the write cache based on a minimum of the metadata pointer and the data pointer.

4. The method of claim 3, further comprising:
performing, by the storage control system, a data destage operation to destage at least one of (i) a full stripe of data from the write cache, and (ii) at least one data item from the write cache; and
advancing the data pointer to point to a location of the last data item persisted to the primary storage as part of the data destage operation.

5. The method of claim 4, further comprising:
updating, by the storage control system, metadata associated with the at least one data item destaged from the write cache to indicate a new storage location of the at least one data item; and
removing, by the storage control system, the at least one data item from the write cache after the updated metadata associated with the at least one data item destaged is persisted to the primary metadata storage.

6. The method of claim 4, further comprising monitoring, by the storage control system, an amount of used capacity of the write cache to determine when the amount of used capacity of the write cache has reached a predefined threshold, wherein the storage control system commences the data destage operation in response to determining that the used capacity of the write cache has reached the predefined threshold.

7. The method of claim 3, further comprising:
performing, by the storage control system, a metadata destage operation to destage at least one metadata item from the write cache to the primary metadata storage; and
advancing the metadata pointer to point to a location of the first metadata item, in the cyclic write order from the tail location to the head location of the write cache, which has not been persisted as part of the metadata destage operation.

8. The method of claim 7, wherein performing the metadata destage operation comprises generating, by the storage control system, a checkpoint to store one or more cached metadata items for a consistent point in time, wherein the checkpoint comprises changes relative to a previous checkpoint generated as part of a previous metadata destage operation.

9. The method of claim 7, further comprising monitoring, by the storage control system, an amount of metadata items in the write cache to determine when the amount of metadata items in the write cache has reached a predefined threshold, wherein the storage control system commences the metadata destage operation in response to determining that the amount of metadata items in the write cache has reached a predefined threshold.

10. The method of claim 8, further comprising in response to a failure event, replaying, by the storage control system, the write cache on top of the previous checkpoint, starting from the metadata pointer of the write cache up to a point of failure.

11. An article of manufacture comprising a non-transitory processor-readable storage medium having stored therein program code of one or more software programs, wherein the program code is executable by one or more processors to implement a method which comprises:
maintaining, by a storage control system, a write cache in a non-volatile memory device of primary memory of a storage node, wherein the write cache comprises a cyclic buffer which comprises a plurality of pointers that are configured to manage the write cache, wherein the plurality of pointers are utilized by the storage control system to track a tail location of the write cache and a head location of the write cache;
receiving, by the storage control system, a write request from a host system, wherein the write request comprises a data item to be written to primary storage;
writing, by the storage control system, the data item together with an associated metadata item to the write cache, wherein the data item and the associated metadata item are written to the head location of the write cache, wherein items in the write cache are arranged in a cyclic write order from the tail location to the head location of the write cache; and
sending, by the storage control system, an acknowledgment to the host system that the data item is successfully written to the primary storage, in response to the data item and the associated metadata item being stored in the write cache.

12. The article of manufacture of claim 11, further comprising program code which is executable by the one or more processors to implement a method which comprises consolidating, by the storage control system, a plurality of data items associated with a plurality of received write requests, together with metadata items associated with the plurality of data items, into a single write operation to the write cache.

13. The article of manufacture of claim 12, wherein:
the plurality of pointers comprise a head pointer, a metadata pointer, and a data pointer;
the metadata pointer points to a location of a first metadata item, in the cyclic write order from the tail location to the head location of the write cache, which has not been persisted in a primary metadata storage;
the data pointer points to a location of a last data item which has been persisted to the primary storage; and
the storage control system determines the tail location of the write cache based on a minimum of the metadata pointer and the data pointer.

14. The article of manufacture of claim 13, further comprising program code which is executable by the one or more processors to implement a method which comprises:
performing, by the storage control system, a data destage operation to destage at least one data item from the write cache to the primary storage;

advancing, by the storage control system, the data pointer to point to a location of the last data item persisted to the primary storage as part of the data destage operation;

updating, by the storage control system, metadata associated with the at least one data item destaged from the write cache to indicate a new storage location of the at least one data item; and removing, by the storage control system, the at least one data item from the write cache after the updated metadata associated with the at least one data item destaged is persisted to the primary metadata storage.

15. The article of manufacture of claim 13, further comprising program code which is executable by the one or more processors to implement a method which comprises:

performing, by the storage control system, a metadata destage operation to destage at least one metadata item from the write cache to the primary metadata storage; and advancing the metadata pointer to point to a location of the first metadata item, in the cyclic write order from the tail location to the head location of the write cache, which has not been persisted as part of the metadata destage operation.

16. The article of manufacture of claim 15, wherein the program code for performing the metadata destage operation comprises program code for generating, by the storage control system, a checkpoint to store one or more cached metadata items for a consistent point in time, wherein the checkpoint comprises changes relative to a previous checkpoint generated as part of a previous metadata destage operation.

17. An apparatus comprising:

at least one processor; and memory configured to store program code, wherein the program code is executable by the at least one processor to instantiate a storage control system, wherein the storage control system is configured to:

maintain a write cache in a non-volatile memory device of primary memory of a storage node, wherein the write cache comprises a cyclic buffer which comprises a plurality of pointers that are configured to manage the write cache, wherein the plurality of pointers are utilized by the storage control system to track a tail location of the write cache and a head location of the write cache;

receive a write request from a host system, wherein the write request comprises a data item to be written to primary storage;

write the data item together with an associated metadata item to the write cache, wherein the data item and the associated metadata item are written to the head location of the write cache, wherein items in the write cache are arranged in a cyclic write order from the tail location to the head location of the write cache; and send an acknowledgment to the host system that the data item is successfully written to the primary storage, in response to the data item and the associated metadata item being stored in the write cache.

18. The apparatus of claim 17, wherein:

the plurality of pointers comprise a head pointer, a metadata pointer, and a data pointer;

the metadata pointer points to a location of a first metadata item, in the cyclic write order from the tail location to the head location of the write cache, which has not been persisted in a primary metadata storage;

the data pointer points to a location of a last data item which has been persisted to the primary storage; and the storage control system determines the tail location of the write cache based on a minimum of the metadata pointer and the data pointer.

19. The apparatus of claim 18, wherein the storage control system is configured to:

perform a data destage operation to destage at least one data item from the write cache to the primary storage;

advance the data pointer to point to a location of the last data item persisted to the primary storage as part of the data destage operation;

update metadata associated with the at least one data item destaged from the write cache to indicate a new storage location of the at least one data item; and remove the at least one data item from the write cache after the updated metadata associated with the at least one data item destaged is persisted to the primary metadata storage.

20. The apparatus of claim 18, wherein the storage control system is configured to:

perform a metadata destage operation to destage at least one metadata item from the write cache to the primary metadata storage; and advance the metadata pointer to point to a location of the first metadata item, in the cyclic write order from the tail location to the head location of the write cache, which has not been persisted as part of the metadata destage operation;

in performing the metadata destage operation, the storage control system is configured to generate a checkpoint to store one or more cached metadata items for a consistent point in time, wherein the checkpoint comprises changes relative to a previous checkpoint generated as part of a previous metadata destage operation.

* * * * *